W. L. BLISS.
OIL RING AND CHAIN.
APPLICATION FILED JULY 18, 1910.
1,245,427.
Patented Nov. 6, 1917.
3 SHEETS—SHEET 2.
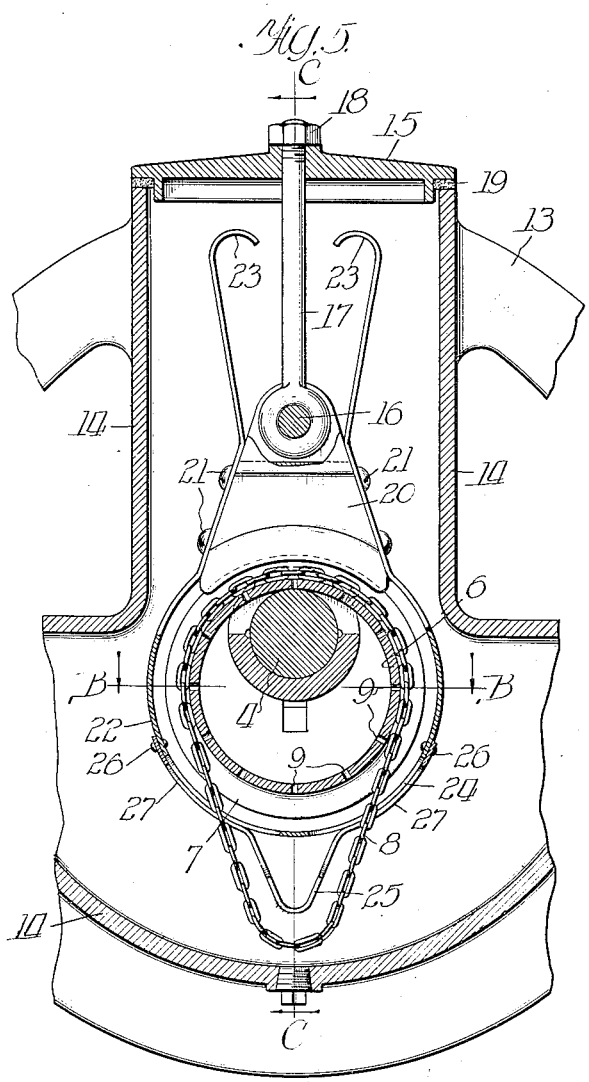
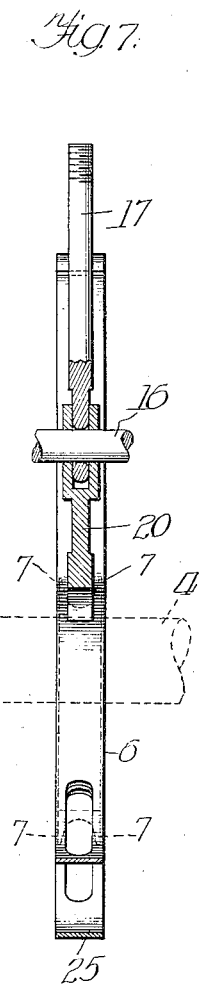
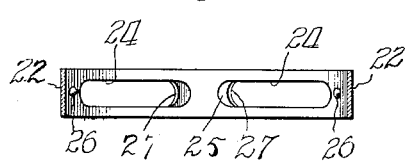
Witnesses:
Robert N. Weir
Geo. B. Jouls
Inventor:
William L. Bliss
By: Edwin B. K. Tower, Jr.
Atty.

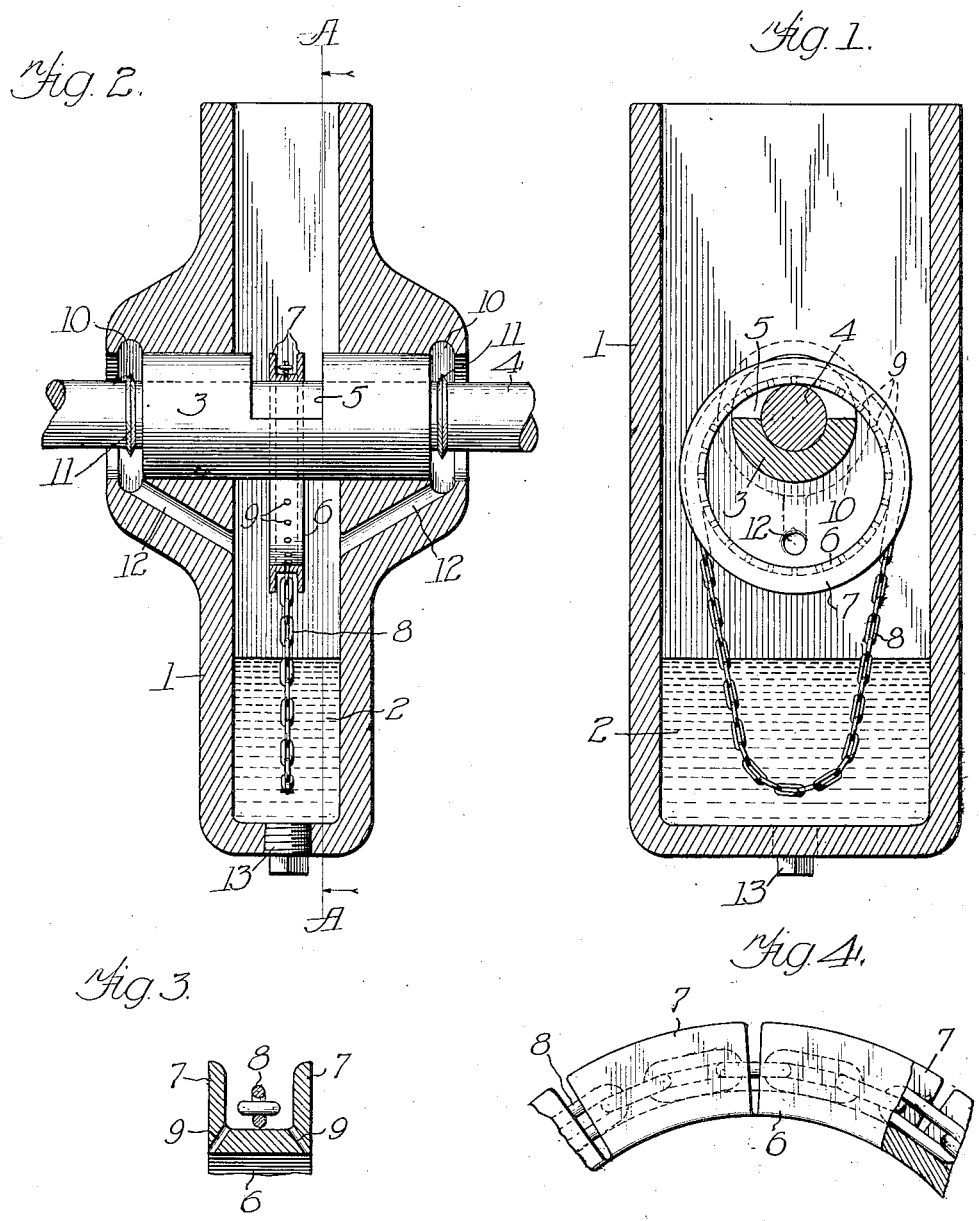

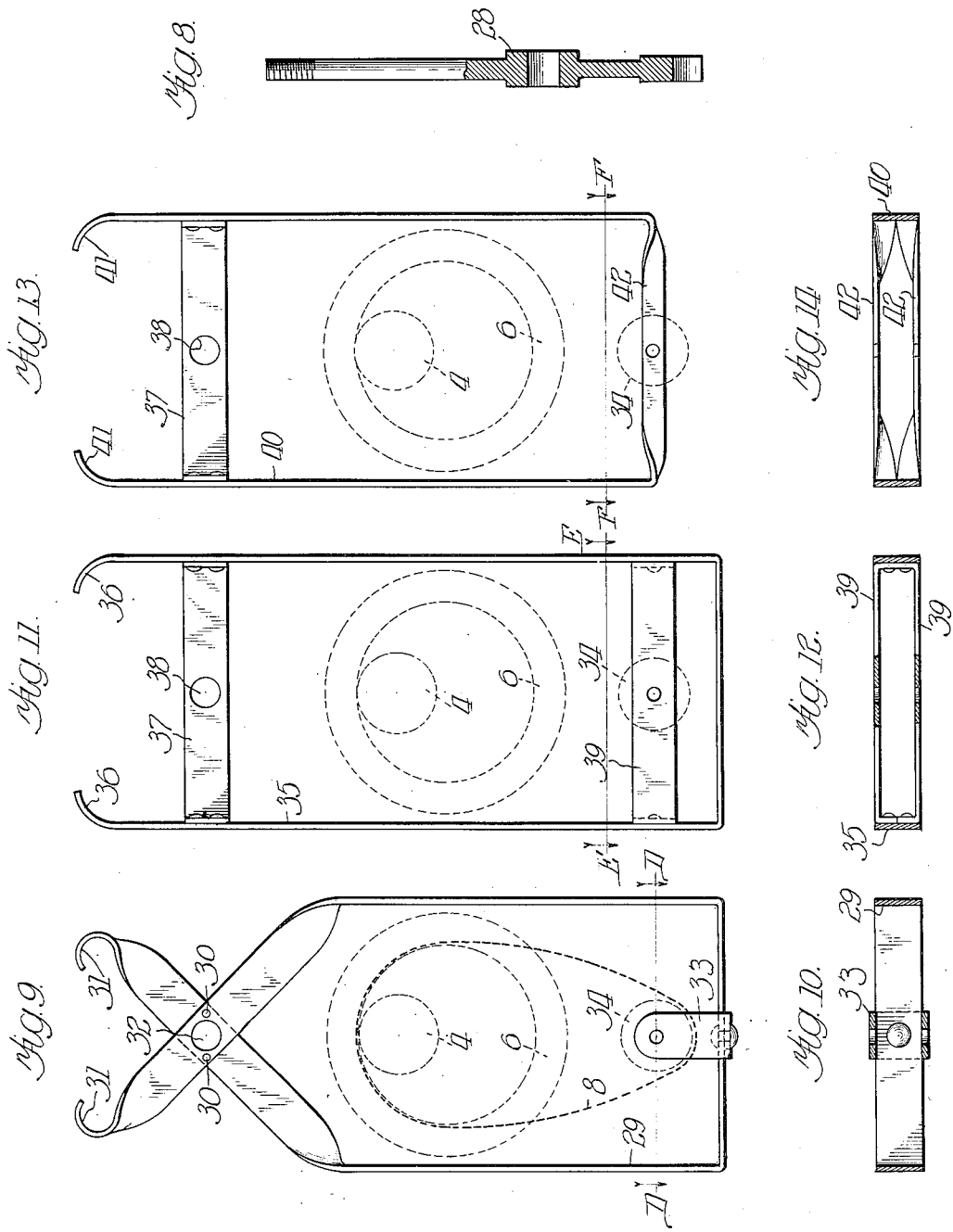

UNITED STATES PATENT OFFICE.

WILLIAM L. BLISS, OF MILWAUKEE, WISCONSIN, ASSIGNOR, BY MESNE ASSIGNMENTS, TO U. S. LIGHT & HEAT CORPORATION, OF NIAGARA FALLS, NEW YORK, A CORPORATION OF NEW YORK.

OIL RING AND CHAIN.

1,245,427.

Specification of Letters Patent.

Patented Nov. 6, 1917.

Application filed July 18, 1910. Serial No. 572,439.

*To all whom it may concern:*

Be it known that I, WILLIAM L. BLISS, a citizen of the United States, residing at Milwaukee, in the county of Milwaukee and State of Wisconsin, have invented new and useful Improvements in Oil Rings and Chains, of which the following is a full, clear, concise, and exact description, reference being had to the accompanying drawing, forming a part of this specification.

My invention relates to a lubricating device. The object of the invention is to provide a simple and improved means of applying lubricating fluid to a bearing by an endless conveyer, carried around by a rotating member and dipping into oil.

In prior devices the attempt has been made to supply oil to a rotating shaft and its bearing by means of an endless chain loosely encircling the shaft and hanging from the shaft low enough to dip into the oil below. It has also been proposed to use a ring loosely encircling a shaft and dipping into oil. With rings or chains alone however, there is generally too much oil supplied to the shaft and bearing so that slopping and flooding are common. Difficulty has also been experienced in providing sufficient friction where a chain alone has been used. In using a ring alone, and of a diameter sufficient to dip into the oil, it becomes necessary to use a very wide housing, which is objectionable.

My invention aims to secure the combined advantages of a ring and chain, by using a ring of small diameter but heavy enough to provide sufficient friction on the shaft, although not necessarily large enough to dip into the oil, and by using also a chain which is carried around by the ring, and which is long enough to dip into the oil and supply oil to the ring. By having a ring that does not dip into the oil and that is not provided with holes, it is apparent that no oil would reach the bearing, but by providing the proper number of holes in the ring, the desired amount of oil can be fed to the shaft and bearing.

In the accompanying drawings, in which are shown simple and practical embodiments of my invention,—

Figure 1 represents a sectional view on the line A—A, Fig. 2, through the shaft and bearing, showing the parts in assembled position.

Fig. 2 is a central sectional view at right angles to that shown in Fig. 1.

Figs. 3 and 4 show modified forms of details.

Fig. 5 is a sectional elevation of a modified form of my device.

Fig. 6 is a section on line B—B, Fig. 5.

Fig. 7 is a vertical central section on line C—C, Fig. 5.

Fig. 8 is a modification of one of the details of Fig. 5.

Fig. 9 is an elevation of a modified form of removable frame.

Fig. 10 is a section on line D—D, of Fig. 9.

Fig. 11 is a further modification of the frame.

Fig. 12 is a section on line E—E, Fig. 11.

Fig. 13 is a still further modification of a frame.

Fig. 14 is a section on line F—F, Fig. 13.

In the first form illustrated, the bearing box 1 is provided with an oil well 2 and contains the bearing 3, which supports the shaft 4. The bearing 3 has a cut away portion 5 near the center, in order that the ring 6 may rest loosely on the shaft 4 and be turned thereby without interfering with the bearing 3. The ring 6 is provided with a double flange 7—7, between which flanges is located the chain 8, the friction between the ring and the chain being sufficient to move the chain, and the friction between the ring 6 and the shaft 4, being sufficient to turn the ring. The ring 6 is provided with a plurality of holes 9, extending radially therethrough in the preferred form, although it is obvious that these holes may be arranged in any suitable manner for conducting the oil from the chain to the surface of the shaft. In Fig. 3, for example, the holes 9 are shown as arranged diagonally. In Fig. 4, slots are cut through the flanges 7—7, to permit the escape of oil, giving to the ring 6 the appearance of a gear wheel. The above modifications are selected simply as suggestive of the many ways in which the oil may be allowed to flow, and not in a limiting sense.

Annular chambers 10 are preferably provided at each end of the bearing 3 for the purpose of collecting the oil thrown from the oil slings 11, and returning said oil to the oil well through the passages 12. The removable plug 13 may be provided for draining the oil well.

The method of conveying the oil from the well to the bearing will now be apparent. The oil is picked up by the chain and delivered upon the ring between the flanges thereof. It then flows or works through the holes in the ring and is spread out upon the exposed portion of the shaft. The revolving motion of the latter distributes the oil to the bearing and journal. The oil, working its way along the surface of the shaft within the bearing, is thrown off by the slings 11, runs down through passages 12, and collects again in the oil well 2.

In the modification in Fig. 5, there is shown a bearing head or housing 13 which carries the structure constituting the oil well, having walls 14—14 and a removable cover 15. A bolt or stud 16 passes through the front and rear walls (not shown) of the chamber and provides means for securing the eye-bolt 17 which passes through the cover 15 and is provided with a nut 18 at its upper end. The gasket 19 is preferably interposed between the cover and the chamber walls 14, whereby a tight connection may be secured between said parts.

The guide member 20 is preferably supported by the bolt 16 which passes therethrough, and has secured thereto in any suitable manner, as for example by screws 21, the frame or support 22, having its upper ends bent over as at 23 to provide a convenient finger grip, and having openings 24—24 cut in the lower end to permit the chain 8 to pass freely down through one side of the frame and up through the other. The guard member 25 is shown preferably as riveted at 26 to the frame 22, and provided with holes 27—27. The guide is primarily provided to prevent the chain from jumping out of the groove of the ring and also to hold it down in the oil when there is a tendency for it to follow in under the shaft, when the oil is thick. No guide is necessary when the machine to which this oiling is applied is not subjected to vibration, and when the oil is of uniform and correct quality or thickness, and when the various parts can be designed large and heavy enough to prevent accidental derangement.

The ring 6, carried by the shaft 4 is similar to that already described, and in view of the above description, the operation will now be apparent. The rotation of the shaft 4 causes the rotation of the ring 6 which carries with it the chain 8, thereby picking up the oil from the well and distributing it to the shaft and bearing through the holes 9. The guide member 20 extends downwardly a slight distance between the upwardly extending flanges 7—7 of the ring 6, as seen particularly in Fig. 7, and thereby prevents the chain 8 from leaving the groove, although providing at the same time, ample clearance space. It is apparent that by removing the bolt 16 and the cover 15 and withdrawing the shaft 4 and the bearing 3, the entire frame and associated parts may be readily lifted from the oil well by means of the inwardly turned ends 23.

In Fig. 8 is shown a modification in which the guide 20 and the bolt 17 of Fig. 5 are combined into a unitary structure 28, the construction of the remaining parts being the same.

In Figs. 9 and 10 there is shown a form of removable frame which is simple and may be cheaply manufactured. The frame consists preferably of a single strip of metal 29, having its ends twisted, crossed and riveted as at 30, and having the extremities turned over to provide a finger hold, as at 31. The opening 32 is adapted to receive the bolt 16 shown in connection with the previous modifications. At the lower end of the frame there is secured, preferably by riveting, a U-shaped member 33, adapted to pivotally support a small sheave 34, shown in dotted outline. The main oil ring 6 is similar to that already described, is supported by the shaft 4 and carries the chain 8 which passes loosely under the sheave 34 and ordinarily clears the same. The object of the sheave 34 is to hold the chain down in the oil and prevent it from riding up when the oil becomes too thick. Whether the chain is held down in the oil well by means of a guide or a sheave, its length is adjusted so that when the parts are all assembled, the chain can not be taken off or lifted over the flanges of the oil ring.

In the modification shown in Figs. 11 and 12, the frame consists preferably of a single strip of metal 35, having inwardly bent ends 36 and having secured thereto cross piece 37 with the hole 38, adapted to receive an engaging bolt not shown, and having secured near the lower end, the cross piece or pieces 39, adapted to pivotally support the sheave 34 for the same purpose as heretofore explained.

In the modification shown in Fig. 13, the frame consists preferably of a single strip of metal 40 having inwardly turned ends 41, and having a portion of its length cut and twisted as shown at 42, to provide convenient means for supporting the sheave 34.

The above three modified forms of frames can be inserted into and removed from the oil well in the same manner as heretofore described. Of course it is obvious that in order to remove the frame and oil ring 6, it is necessary to withdraw the armature shaft 4 and its bearing 3.

The above modifications are simply suggestive of the various changes which may be made in the device and are not inserted by way of limitation. The invention is not limited to the details shown and described, but includes broadly any equivalent means for producing the desired result and coming within the scope of the appended claims.

What I claim as my invention and desire to secure by Letters Patent of the United States is:

1. In a device of the nature described, in combination, a shaft, a bearing therefor, a container adapted to hold oil below the shaft, means for transmitting the oil between the container and the shaft, means movable by the shaft for operating said last means, and a unitary guard and support for the two last said means removable from the container transversely of said shaft.

2. In a device of the nature described, in combination, a shaft, a bearing therefor, a container adapted to hold oil below the shaft, means whereby the oil is conveyed from the container to the shaft, said means comprising a ring hanging eccentrically on said shaft and rotatable thereby and an endless chain hanging on said ring having a depending loop adapted to move through the oil in the container, and a unitary guard and support for said means removable from the container transversely of said shaft.

3. In a device of the nature described, in combination, a container, a rotating member, a ring encircling said member and adapted to be supported and moved thereby, a chain loosely mounted on and movable by said ring, and means adapted to confine the movement of said ring and said chain within certain limits, said last means being constructed and arranged to effect removal of said ring and said chain from said container in a direction transversely of said shaft.

4. In a device of the nature described, in combination, a container, a rotatable shaft, a ring of substantially larger diameter than said shaft hung loosely thereon, said ring being provided with a peripheral groove and having openings, a chain carried loosely in the groove of said ring, said chain having a depending loop adapted to collect a lubricant and means for guarding and supporting the associated ring and chain so that the same may be introduced into or removed from said container transversely of the shaft.

5. In a device of the nature described, in combination, a container, a rotatable shaft, a ring of substantially larger diameter than said shaft hung loosely thereon, said ring being provided with a peripheral groove and having openings, a chain carried loosely in the groove of said ring, said chain having a depending loop adapted to collect a lubricant, means for guarding and supporting the associated ring and chain so that the same may be introduced into or removed from said container transversely of the shaft and means adapted to guide the loop of said chain to prevent substantial displacement thereof.

6. In a device of the nature described, in combination, a removable support and guard for an oil chain and ring, said support and guard comprising a substantially U shaped structure, having a finger hold at its upper end, a crosspiece for securing it within a housing and guiding portions adapted to prevent substantial displacement of the oil chain and ring.

In witness whereof, I have hereunto subscribed my name in the presence of two witnesses.

WILLIAM L. BLISS.

Witnesses:
C. E. MEAD,
ERNEST EMERSON.